Oct. 21, 1941.  F. B. HEWEL  2,259,975
TIRE-RETREADING APPARATUS
Filed March 16, 1937  2 Sheets-Sheet 1
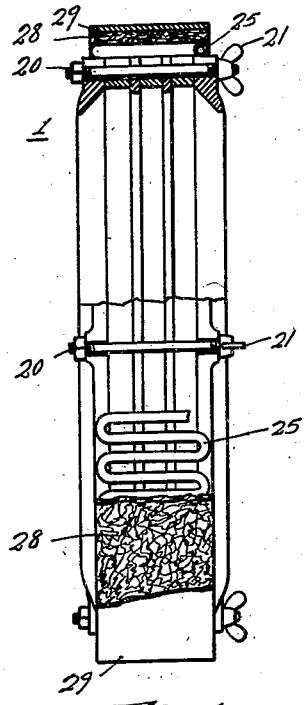
Fig. 1.
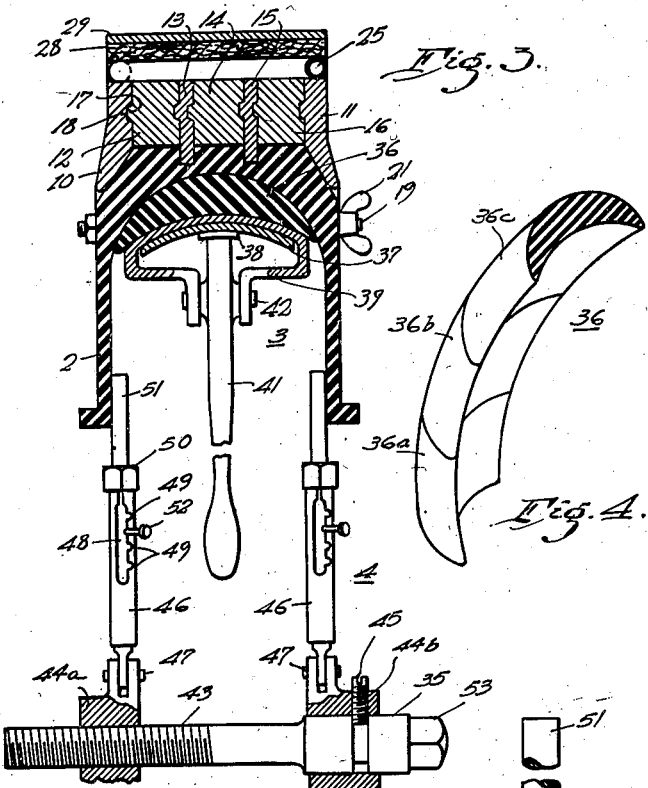
Fig. 3.
Fig. 4.
Fig. 5.
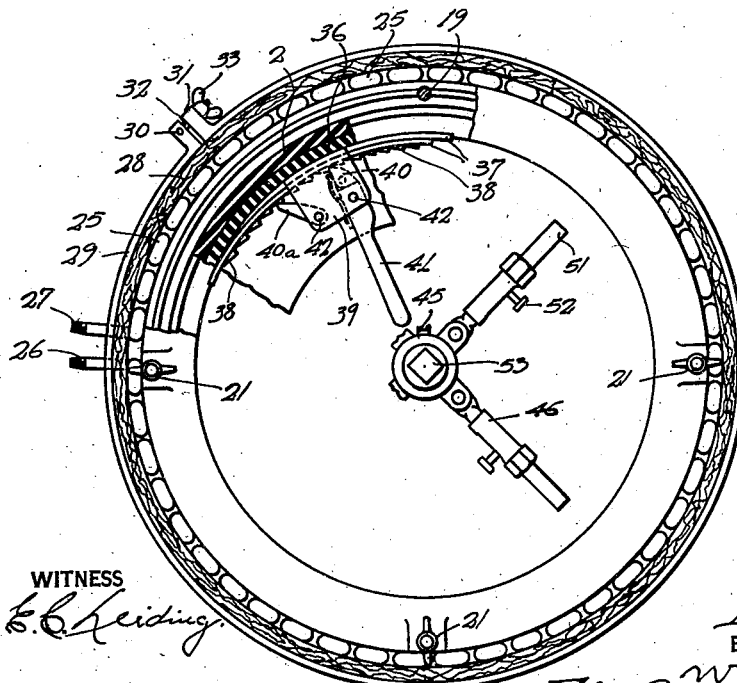
Fig. 2.
WITNESS
E. C. Leiding
INVENTOR
Frank B. Hewel
BY William R. Coley
ATTORNEY Oct. 21, 1941.   F. B. HEWEL   2,259,975
TIRE-RETREADING APPARATUS
Filed March 16, 1937   2 Sheets-Sheet 2
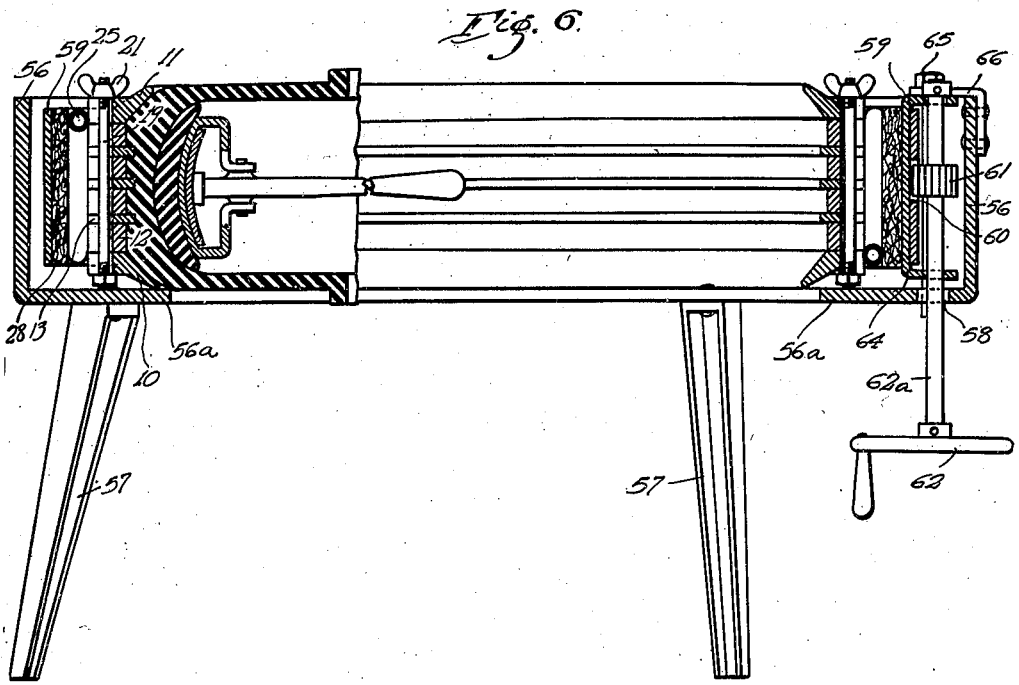
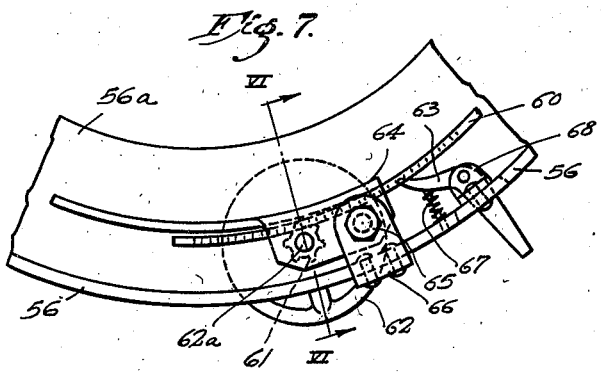
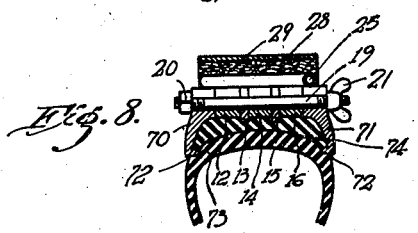
WITNESS.
E. C. Leiding.
INVENTOR
Frank B. Hewel
BY
William R. Coley
ATTORNEY Patented Oct. 21, 1941

2,259,975

UNITED STATES PATENT OFFICE 2,259,975

TIRE-RETREADING APPARATUS

Frank B. Hewel, Pittsburgh, Pa.

Application March 16, 1937, Serial No. 131,157

3 Claims. (Cl. 18—45)

My invention relates to tire-retreading apparatus and has for one object to provide a structure for this purpose which is adapted for quick assembly and disassembly.

Another object of my invention is to provide a relatively simple structure of the character set forth which is adapted to readily accommodate different diameters and widths of tire casings.

A further object of my invention is to provide a tire-retreading device in which the structure for contacting and marking a pattern on the tire tread includes a plurality of alined, mechanically interlocked, interchangeable rings or other members.

Another object of my invention is to provide an apparatus of the character just set forth in which removable heating means, preferably in the form of a sinuously-shaped steam pipe, is held in intimate relation with the mechanically interlocked rings.

A further object of my invention is to provide a device for readily internally expanding a tire casing, preferably comprising a band structure including manually-operable means such as a pawl and ratchet for selectively increasing or decreasing the effective length of said band structure and its degree of pressure against the casing, preferably through resilient pad means.

Another object of my invention is to provide an apparatus for positioning or straightening one or both side walls of a tire casing during the retreading operation, comprising a central mounting means disposed in the enclosed space radially within the casing walls, a plurality of arms, preferably of a telescopic type, being disposed on said mounting means and being extensible to engage or disengage the side walls and also being laterally shiftable along the mounting means, thus permitting such arms to be placed both radially and laterally in any desired position.

Another object of my invention is to so combine and coordinate the above-described external and internal structures as to provide for ready assembly, rapid and effective retreading treatment and ready disassembly, with provisions for taking care of different tire sizes.

My invention may best be understood by reference to the accompanying drawings, wherein:

Figure 1 is a transverse sectional view, with parts broken away, of the outer members of a tire retreading device embodying my present invention;

Fig. 2 is a view in side elevation, with parts broken away, of the apparatus shown in Fig. 1;

Fig. 3 is an enlarged transverse sectional view of a portion of my tire retreading apparatus showing both the internal and the external coordinating parts;

Figs. 4 and 5 are detailed views of portions of the structure shown in Fig. 3;

Fig. 6 is a transverse sectional view of a modified form of the apparatus shown in the previous figures;

Fig. 7 is a detailed plan view of a portion of the apparatus shown in Fig. 6; and Fig. 8 is a cross-sectional view of a modified form of retreading ring assembly.

Referring to Figs. 1 to 5 of the drawings, the structure here shown comprises a tire-retreading apparatus having external means 1 for contacting and cutting a pattern on the new tire tread of or recapping a tire casing 2 and also re-siding the tread, a source of heat being included therein; an internal expanding structure 3 for providing the necessary internal pressure when the new tire tread is being formed, and an apparatus 4 for straightening and positioning the side walls of the tire casing 2 during the retreading operation.

The external structure 1 comprises a plurality of side or end rings or members 10 and 11 and a plurality of intermediate rings, shown here as being five in number and respectively designated as 12, 13, 14, 15 and 16, which jointly contact and provide the pattern for the new tire tread or recap and also the new side portions on the tire casing 2.

It will be noted that, by providing a series of suitably designed intermediate tread-contacting members, similar to 12 to 16, inclusive, any desired width and pattern of a tire tread and re-siding may be cut on any given diameter of casing by simply assembling and alining the proper intermediate ring members, such assembly and alinement being readily effected in my apparatus by reason of the provision of mechanical interlocking means on such rings comprising, for example, substantially circular ridges 17 on one side of each ring for coacting with substantially circular grooves 18 on the confronting side of each adjacent ring. Moreover, the side or end rings 10 and 11 may be of any desired size (corresponding to the intermediate rings) and carry any desired pattern for building up the sides of or re-siding the tire tread. In this way, the desired assembly corresponding to the diameter and width of the tire to be recapped and re-sided is readily placed in position and is held in such alined position by means of a through bolt 19, disposed in a suitable slot and having one end forming a square head 20, the other end being provided with a threaded wing nut 21. A change from one form of intermediate or side rings to another for effecting a different recapping or re-siding result may thus be readily accomplished. It will be understood that the side rings and intermediate or tread rings may have any desired design or pattern, the tread rings to make a block or figure tread, for example, and the side rings to preferably provide a non-skid arrangement.

A source of heat, preferably comprising a transversely sinuously-wound steam pipe 25, which may be formed of thin copper tubing, for example, and which has suitable inlet and outlet ends 26 and 27 projecting from the assembly, is placed around the ring assembly 10 to 16, inclusive, being held in place, first, by a heat-insulating ring 28 of asbestos or the like and then by an outer adjustable steel metal band 29, the ends of which are provided with suitable lugs 30 and 31, a suitable swing bolt 32 being provided on its free end with a wing nut 33. Any suitable means may be employed for delivering steam to inlet 26 and exhausting it from outlet 27. It will be understood that electrical or other heating means may be employed in lieu of steam pipe 26, if desired.

By wrapping the heat-insulating strip 28 and the outer metal band 29 around the sinuous steam pipe 25 and adjustably securing the ends of the metal band 29 in position by means of the swing bolt 32, it will be noted that the steam pipe 25 is maintained in intimate relation with the composite ring structure 10 to 16, inclusive, and the heat is directed into such structure by reason of the provision of the outer heat-insulating strip 28.

Either before or after the assembly of the steam pipe 25, heat-insulating strip 28 and outer metal band 29, the tire casing 2 may be placed in position within the ring assembly to occupy the position shown in Fig. 3.

The internal expanding assembly 3 may comprise resilient pad means 36, preferably comprising a series of short, curved rubber members such as 36a, 36b and 36c, as shown in Fig. 4, which are held against the internal wall of the tire casing 2 by means of a metal strip 37 a part of which is provided with suitable ratchet members 38 comprising, for example, upstruck portions from the metal strip 37 or a separate band secured thereto. To provide a suitable pawl structure to cooperate with such ratchet portions, the metal strip is provided near one end with a yoke 39 having arms to which a pawl 40 on the end of a lever or handle member 41 and an anchoring pawl 40a are suitably pivoted as by means of pins 42, for example.

By utilizing the sectionalized resilient pad 36, any given diameter of tire casing may be accommodated, and by operating the pawl and ratchet structure illustrated, that is, by manipulating the handle 41 to cause the pawls 40 and 40a to successively engage ratchet members 38, any desired increase or decrease in the effective length of the metal band 37 and, therefore, the outward pressure thereof against the rubber pad 36 may be provided. It will be understood that other forms of adjustable mechanism for varying such length and pressure may be employed, if desired, in lieu of the illustrated pawl and ratchet structure.

By means of the illustrated external and coordinating internal apparatus so far described, it will be noted, therefore, that the tire casing is tightly held in its proper location against the recapping and re-siding rings 10 to 16, inclusive, which may be suitably heated by means of the insulated steam pipe structure 25 which is held in intimate relation with such rings by means of the external metal band 29.

In order to straighten and stretch the side walls of the casing 2 to check for any loose plies of fabric and to permit ready manipulation of the handle 41, for example, I provide the structure 4 which comprises a central mounting means or rod 43 having hub members 44a and 44b mounted thereon, the hub 44a being internally screw-threaded to cooperate with the externally screw-threaded left-hand portion of the rod 43, while the hub 44b fits on an unthreaded portion 35 of the rod and may be tightly held thereon when desired by means of a suitable set screw 45.

Any suitable number, such as four, arm structures 46 may be pivotally mounted on each of the hub members 44a and 44b, as indicated at 47, these arm structures being preferably telescopic in nature, although any other form, such as a jointed arm, may be employed, which will provide a readily extensible and retractable arm for the desired purpose of straightening and positioning the side walls of the casing 2.

The illustrated telescopic structure comprises sleeves or hollow rods 46 each of which has an elongated slot 48 therein, the slot having a plurality of notches 49 on one side thereof. A rod 51 is adapted to slide or telescope within each sleeve 46 and is provided with a laterally-extending pin or knob 52 for the purpose of readily engaging one of the notches 49. A nut 50 having an internal tapered thread is provided at the upper end of the sleeve 46 in order to hold the parts in any desired position.

It will be noted that, by loosening the nut 50 and then manipulating the knob 52, the telescopic rod 51 may be placed in any desired extended or retracted position, and then the knob may be fitted into one of the notches 49 to temporarily maintain the rod in the selected position, which selection depends upon the size of the tire casing, as will be understood. To maintain the rod 51 in the selected extended position, the nut 50 is then tightened and the side walls of the tire casing may thus be held in the illustrated straightened position as soon as all of the telescopic arms, such as four on each side, have been properly manipulated.

In order to provide for suitable lateral positioning of the telescopic rods 51 so as to force the tire side walls outwardly as far as desired, the central mounting member or threaded rod 43 may be turned as by means of a wrench on the straight-sided head 53 after the set screw 45 has been loosened, thereby causing hub 44a and its four telescopic arm structures to move away from or towards the telescopic arms mounted on the hub 44b by reason of the threaded connection between rod 43 and hub 44a.

By reason of the various adjustable features present in apparatus 4, therefore, the side walls of the casing may be readily and effectively held in the desired position, both as regards width and diameter because of the radial and lateral adjustable features of the apparatus.

In case it is not desired to employ a tire-retreading apparatus, such as that described above, on a bench or other available supporting member, a convenient mounting device or framework for permitting ready assembly and manipulation of the character shown in Figs. 6 and 7 may be employed. This device comprises a metallic ring 56 having an annular base 56a integrally or otherwise secured thereto, together with suitable supporting legs 57. A small opening 58 is provided in one portion of the base member 56a for a purpose to be described. In this way, a suitable holding trough or ring for an apparatus such as that shown in the preceding figures is provided.

Preferably, however, the outer metal band 29 is omitted in favor of a pawl and ratchet type of adjustable band for convenience of manipulation within the framework shown in Fig. 6. An outer band 59 is provided with a plurality of upstruck or other ratchet portions 60 and one end of the metal band is provided with a toothed collar 61 mounted on a shaft 62a which shaft may be manipulated from below by means of a rotatable handle 62 projecting through the opening 58, a manually-operable pawl 63 being provided to lock the band member 59 in the desired position tightly surrounding the tire-retreading assembly.

Shaft 62a may be mounted in a yoke 64, the upper side of which is suitably secured, as by a bolt 65, to an angle member 66 that is riveted or otherwise fastened to framework 56.

Pawl 63 may be of a familiar character having a spring 67 biasing one arm of the pawl to engagement with ratchet portions 60. The pawl may be suitably mounted on framework 56, as shown at 68.

The use of the apparatus shown in Fig. 6 will be readily understood. Preferably, the outer metal band 59 remains in the framework, as indicated, and after the remaining parts of the tire-recapping and re-siding device up to and including the asbestos strip 28 have been properly assembled, the entire structure is placed within the band 59 in the illustrated framework and the band then tightened by means of the handle 62. After the tire-retreading operation has been completed, the band 59 is loosened and the assembly removed, so that the apparatus is ready for a new assembly to be placed therein.

In many cases of tire retreading, it would be very desirable to add new rubber to the outer part of the casing sides, but this has not been feasible, with the retreading apparatus available in the prior art, without overheating the fabric at the sides. Consequently, only the recap has been added.

By the use of the apparatus shown in Fig. 8, this difficulty may be overcome, thereby providing a tire with better non-skid characteristics and one with an improved appearance, relative to those just mentioned having the recap only.

The structure of Fig. 8 may utilize the intermediate tread-contacting rings 12 to 16, inclusive, flanked by end ring members 70 and 71 which are different from those shown in the preceding figures, each being provided with an inwardly extending circumferential flange or ridge 72, which projects into the old rubber of casing 73, these flanges acting as stops or boundaries for the new tread or crown 74. The remaining parts illustrated external to the tire casing may be similar to those shown in Fig. 1 or in Fig. 2. It will be understood that the internal structures 3 and 4 of Fig. 3 are also employed.

It will be noted that the new tread or crown extends laterally in both directions beyond the intermediate rings 12 to 16, inclusive, building up new outer side portions on the casing 73. By reason of the internal contour of the end rings 70 and 71 (which may carry any desired pattern or marking) and the location of circumferential flanges 72, sufficient heat is applied from steam pipe 25 to the end rings (as well as to the intermediate rings) to cause the old and new rubber to merge into the wide recap or crown 74, without overheating the side walls of the casing 73.

As the result, when the retreaded casing is removed, a full crown 74 of new rubber is secured thereto, imparting a fine appearance to the old tire casing, and a circumferential non-skid groove appears at each side of this new rubber crown 74 where the flanges 72 were located. These flanges, therefore, during the retreading process serve as boundaries or stops for the crown of new rubber and at the same time serve to produce the non-skid grooves mentioned.

It will be seen that I have thus provided a tire-retreading apparatus which may be quickly assembled and disassembled and which will readily accommodate different diameters and widths of tire casings. The assembly of the various coordinating parts, including the outer heated tire-contacting rings, the inner adjustable pressure member and the side wall straightening members, may all be readily assembled to coordinate in producing a quick and effective tire-retreading operation.

While I have shown certain structural details and arrangements of parts embodying my present invention, it will be understood that various other modifications thereof may be effected without departing from the spirit and scope of my invention. I desire, therefore, that only such limitations shall be imposed thereon as are those set forth in the appended claims, in which the term "tire-retreading" is employed generically to cover recapping or the like as well as retreading proper.

I claim as my invention:

1. Apparatus for internally expanding a tire casing comprising a plurality of separate and readily removable resilient arcuate rubber pad means arranged in an annular series and positioned to engage the inner wall of the casing substantially opposite the tread thereof, an annular band structure disposed in contact with the inner faces of said pad means, said band structure including manually operable means for selectively increasing or decreasing the effective diameter of said band structure whereby to vary its degree of pressure against said pad means.

2. Apparatus for internally expanding a tire casing comprising a plurality of separate, resilient, arcuate pad means arranged in an annular series and positioned to engage the inner wall of the casing substantially opposite the tread thereof, an annular band structure disposed in contact with the inner faces of said pad means, said band structure including ratchet portions on the inner band face and a pawl selectively engageable with said portions to increase or decrease the effective diameter of said band structure whereby to vary its degree of pressure against said pad means.

3. Apparatus for internally expanding a tire casing comprising a plurality of separate, resilient, arcuate pad sections arranged in an annular series and positioned to engage the inner wall of the casing substantially opposite the tread thereof, an annular metallic band disposed in contact with the inner faces of said pad sections and having a plurality of upstruck ratchet portions on its inner face, and a pawl member mounted at one end of said band for selectively engaging said portions to increase or decrease the effective diameter of said band whereby to vary its degree of pressure against said pad sections.

FRANK B. HEWEL.